(12) United States Patent
Ferlitsch (10) Patent No.: US 7,327,482 B2
(45) Date of Patent: Feb. 5, 2008

(54) INTEGRATED PRINTER MONITORING (75) Inventor: Andrew Rodney Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 787 days.

(21) Appl. No.: 10/271,939

(22) Filed: Oct. 15, 2002

(65) Prior Publication Data

US 2004/0070779 A1    Apr. 15, 2004

(51) Int. Cl.
*B41J 29/393* (2006.01)
*G06K 1/00* (2006.01)

(52) U.S. Cl. .................. 358/1.15; 358/1.13; 709/222; 710/10

(58) Field of Classification Search ............... 358/1.15, 358/1.13, 1.14, 1.16; 710/8, 10, 15–19; 713/1–2, 713/100; 709/219, 222, 229
See application file for complete search history.

(56) References Cited

U.S. PATENT DOCUMENTS

| | | | | |
|---|---|---|---|---|
| 5,937,151 A * | 8/1999 | Kadota | ...................... | 358/1.15 |
| 5,960,168 A * | 9/1999 | Shaw et al. | ................. | 358/1.15 |
| 6,202,092 B1 | 3/2001 | Takimoto | .................... | 709/295 |
| 6,233,414 B1 | 5/2001 | Farrell | ......................... | 399/81 |
| 6,246,485 B1 | 6/2001 | Brown et al. | .............. | 358/1.13 |
| 6,249,716 B1 | 6/2001 | Edens et al. | ................ | 700/222 |
| 6,266,693 B1 | 7/2001 | Onaga | ........................ | 709/219 |
| 6,452,692 B1 * | 9/2002 | Yacoub | ...................... | 358/1.15 |
| 6,498,656 B1 | 12/2002 | Mastie et al. | .............. | 358/1.15 |
| 2001/0002958 A1 | 6/2001 | Ito | .............................. | 400/62 |
| 2002/0063880 A1 * | 5/2002 | Raney | ........................ | 358/1.14 |
| 2002/0067504 A1 * | 6/2002 | Salgado et al. | ............ | 358/1.15 |
| 2002/0116439 A1 | 8/2002 | Someshwar et al. | ........ | 709/109 |
| 2002/0174209 A1 * | 11/2002 | Sesek et al. | ................ | 709/223 |
| 2003/0035122 A1 | 2/2003 | Amargar et al. | ............. | 358/1.1 |

FOREIGN PATENT DOCUMENTS

| | | |
|---|---|---|
| EP | 0 917 042 | 5/1999 |
| EP | 0 738 949 | 2/2002 |

* cited by examiner

*Primary Examiner*—Kimberly A Williams
(74) *Attorney, Agent, or Firm*—Kirton & McConkie; Michael F. Krieger (57) ABSTRACT Systems and methods for monitoring the despooling of a print job. In particular, the present invention relates to systems and methods for providing an integrated printer capabilities/status monitor having a front end and a back end of the printing process for identifying printers, printing capabilities, and status of printers, and for providing a printing device switchout and job completion notification, such that the capabilities and the printing process may be determined and monitored in a unified manner throughout the processing of the print job.

20 Claims, 4 Drawing Sheets

INTEGRATED PRINTER MONITORING

BACKGROUND OF THE INVENTION

1. Field of the Invention

The present invention relates to monitoring the despooling of a print job. In particular, the present invention relates to systems and methods for providing an integrated printer capabilities/status monitor having a front end (i.e., printer driver) and a back end (i.e., print processor) of the printing process for identifying printers, printing capabilities, and status of printers, and for providing a printing device switchout and job completion notification, such that the capabilities and the printing process may be determined and monitored in a unified manner throughout the processing of the print job.

2. Background and Related Art

Current techniques used to monitor a print job are performed through an independent process. For example, in the Microsoft® Windows family of operating systems, a printer monitor independently monitors the spooling of a print job. Generally, the printer monitor monitors the spooling process. If the print job is locally despooled, as with a locally connected printer, or directly despooled to a remote printer, the progress of despooling the print data to the printing device is monitored. If the print job is remotely despooled, as with a print server, the progress of despooling a print job from the print server to the printing device is monitored. While this technique is available, it does not monitor the progress of the print job on the printing device.

Several products exist that independently monitor the status of a printing device. One such product is Sharp® Corporation's Status Monitor, version 3.0, which employs a technique where the printer monitor polls the printing device (e.g., SNMP, IPP) to find its current printing status.

The printer's status is typically categorized as "offline," "ready to print," "busy," "error state," or "warning state." Examples of an offline status include "software offline" (e.g., control panel), "non-communicating" (e.g., power-off), or "non-responsive" (e.g., faulty component). Examples of a ready to print status include "cool" (e.g., printing engine needs to warm up), "warming up" (e.g., printing engine is warming up), or "ready" (e.g., printing engine is warmed up). Examples of a busy status include "processing print data" (e.g., print data downloaded, but printing has not started printing) or "printing print data" (e.g., printing has started). Examples of an error state status include "print job failure" (e.g., paper jam, load paper, etc.), "fault" (e.g., component faulted), or "unprocessed" (e.g., cannot process print data, such as unrecognized PDL). Examples of warning state status include "resource low" (e.g., low toner).

While this technique solves the problem of not monitoring the printing device, the technique does not discover the capabilities of the printing device. Accordingly, other products have been developed, such as such as Sharp® Corporation's EZ Cluster v1.0. The printer monitor polls the printing device to determine its capabilities, such as locality (e.g., printer name, print queue, IP address, location description, owner, commentary, etc.), PDL Interpreters (e.g., raster, PDL (PCL, Postscript), etc.), imaging (e.g., printable area, color vs. black & white, resolution (dpi), etc.), collation (e.g., copy collation, face up, etc.), special printing (e.g., duplex, booklet, N-up, etc.), and finisher (e.g., hole punch, stapling, stitch, etc.). While this technique solves the problem of monitoring the printing device, it cannot discover alternate printing devices.

Other available techniques include alternately using an interrupt/trap model vs. polling. Such techniques have the advantage of generating less traffic on a network and responding in real time. In particular, the printing device has a protocol that supports a registration service, where clients can register that they be interrupted for specific events (i.e., traps). A simple network management protocol ("SNMP") is an example of such a service. However, this technique also includes undesirable features.

Thus, while techniques currently exist that are used to monitor a print job, challenges still exist. Accordingly, it would be an improvement in the art to augment or even replace current techniques with other techniques.

SUMMARY OF THE INVENTION

The present invention relates to monitoring the despooling of a print job. In particular, the present invention relates to systems and methods for providing an integrated printer capabilities/status monitor having a front end and a back end of the printing process for identifying printers, printing capabilities, and status of printers, and for providing a printing device switchout and job completion notification, such that the capabilities and the printing process may be determined and monitored in a unified manner throughout the processing of the print job.

Implementation of the present invention takes place in association with a printing environment. A print job is initiated and a printer driver selected. A printing source writes the printing instructions to the printer driver. The printer driver then either journals the printing instructions (e.g., EMF) or renders the printing instructions into the printer ready data (i.e., Raster or PDL), and spools the print data to a spooler, which despools the print data to a print processor associated with the printer driver. If the data is printer ready data, the print processor writes the print data directly to the port manager of the printing device. Alternatively, if the print data is journaled data, the print processor plays back the journaled printing instructions back to the printer driver, which renders the journaled data into printer ready data and spools the printer ready data to the spooler. The spooler then despools the print data directly to the port manager of the printing device (e.g., in a Windows 98/Me environment) or despools the print data to the print processor, which then despools the print data directly to the port manager of the printing device (e.g., in a Windows NT/2K/XP environment).

Prior to the selection of the printer driver, or upon initiation of a selection of a printer driver, the printer monitor discovers printing devices and printer drivers that are discoverable from the printing source. If a discovered printing device does not have a printer driver installed on a printer server, the printer monitor locates and installs the corresponding or a compatible printer driver for the printing device to be considered as accessible. Upon discovery of the printing devices, the printer monitor then discovers the capabilities of the discovered printing devices. In one embodiment, the printer monitor also discovers the status of the devices. After discovery, the information may be preserved.

The printer driver and/or print processor query the printer monitor to obtain status and capability information relating to one or more printers. The information may be preserved and is selectively used by the printer driver and/or print processor to perform a desired process.

While the methods and processes of the present invention have proven to be particularly useful in association with the spooling and despooling subsystems of the Microsoft® Windows family of operating systems, those skilled in the art can appreciate that the methods and processes can be used in a variety of different applications, in a variety of different system configurations, and in association with a variety of different spooling and despooling subsystems of other operating systems, such Apple MacIntosh® operating systems, Linux® operating systems, Unix® operating systems, and IBM® Mainframe MVS operating system.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to monitoring the despooling of a print job. In particular, the present invention relates to systems and methods for providing an integrated printer capabilities/status monitor having a front end and a back end of the printing process for identifying printers, printing capabilities, and status of printers, and for providing a printing device switchout and job completion notification, such that the capabilities and the printing process may be determined and monitored in a unified manner throughout the processing of the print job.

Embodiments of the present invention embrace a printing environment. In one embodiment, a print job is initiated and a printer driver selected. A printing source writes the printing instructions to the printer driver, which either journals the printing instructions (e.g., EMF) or renders the printing instructions into printer ready data (i.e., Raster or PDL), and spools the print data to a spooler, which despools the print data to a print processor associated with the printer driver. If the data is printer ready data, the print processor writes the print data directly to the port manager of the printing device.

Alternatively, if the print data is journaled data, the print processor plays back the journaled printing instructions back to the printer driver, which renders the journaled data into printer ready data and spools the printer ready data to the spooler. The spooler then despools the print data directly to the port manager of the printing device, as in Windows 98/Me environments. Alternatively, in other systems, such as in a Windows NT print server, the journaled data may be despooled at a print queue on the print server. The spooler on the print server would then despool the print job in a manner as described previously.

Prior to the selection of the printer driver, or upon initiation of a selection of a printer driver, the integrated printer monitor discovers printing devices and printer drivers that are discoverable from the printing source. If a discovered printing device does not have a printer driver installed on a printer server, the integrated printer monitor locates and installs the corresponding or a compatible printer driver for the printing device to be considered as accessible. Upon discovery of the printing devices, the printer monitor then discovers the capabilities and status of the discovered printing devices. After discovery, the information may be preserved.

The printer driver and/or print processor query the printer monitor to obtain status and capability information relating to one or more printers. The information is selectively used by the printer driver and/or print processor to perform a desired process, as will be further explained below.

The following disclosure of the present invention is grouped into two subheadings, namely "Exemplary Operating Environment" and "Providing Integrated Printer Monitoring." The utilization of the subheadings is for convenience of the reader only and is not to be construed as limiting in any sense.

Exemplary Operating Environment

Figure 1:
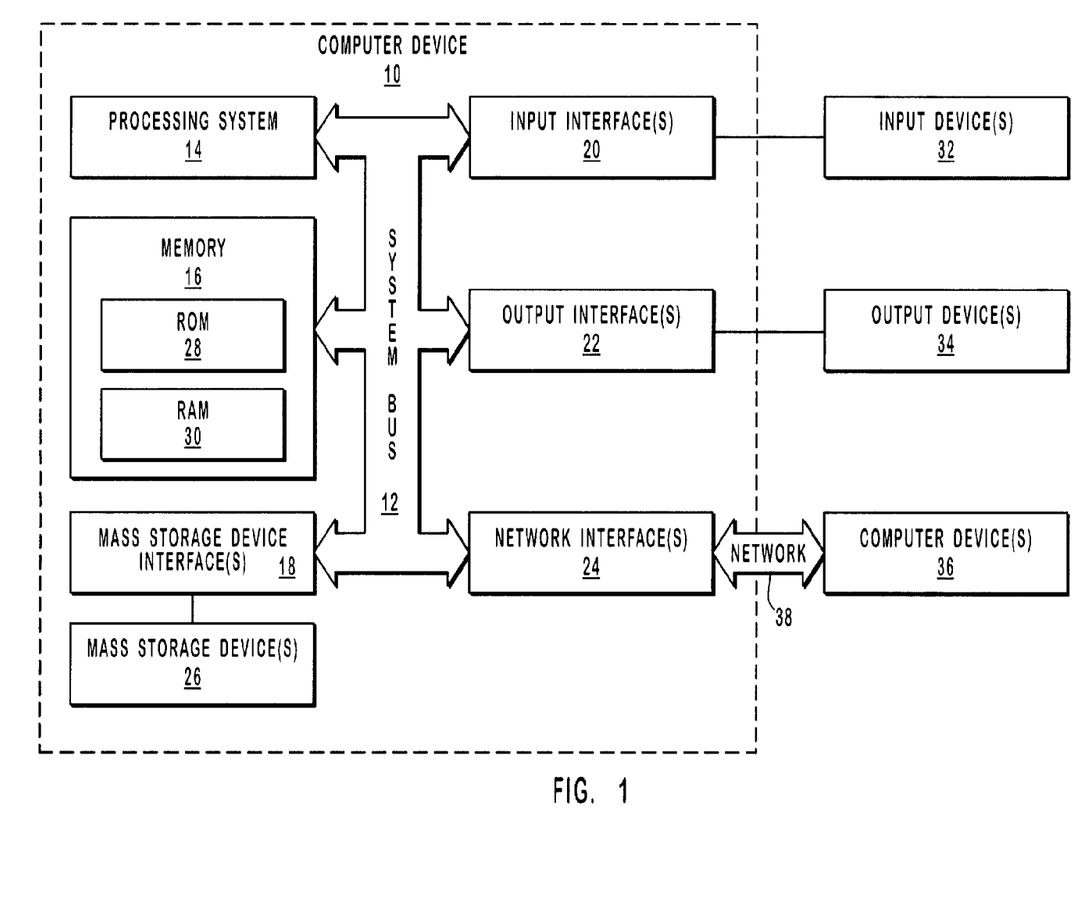
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
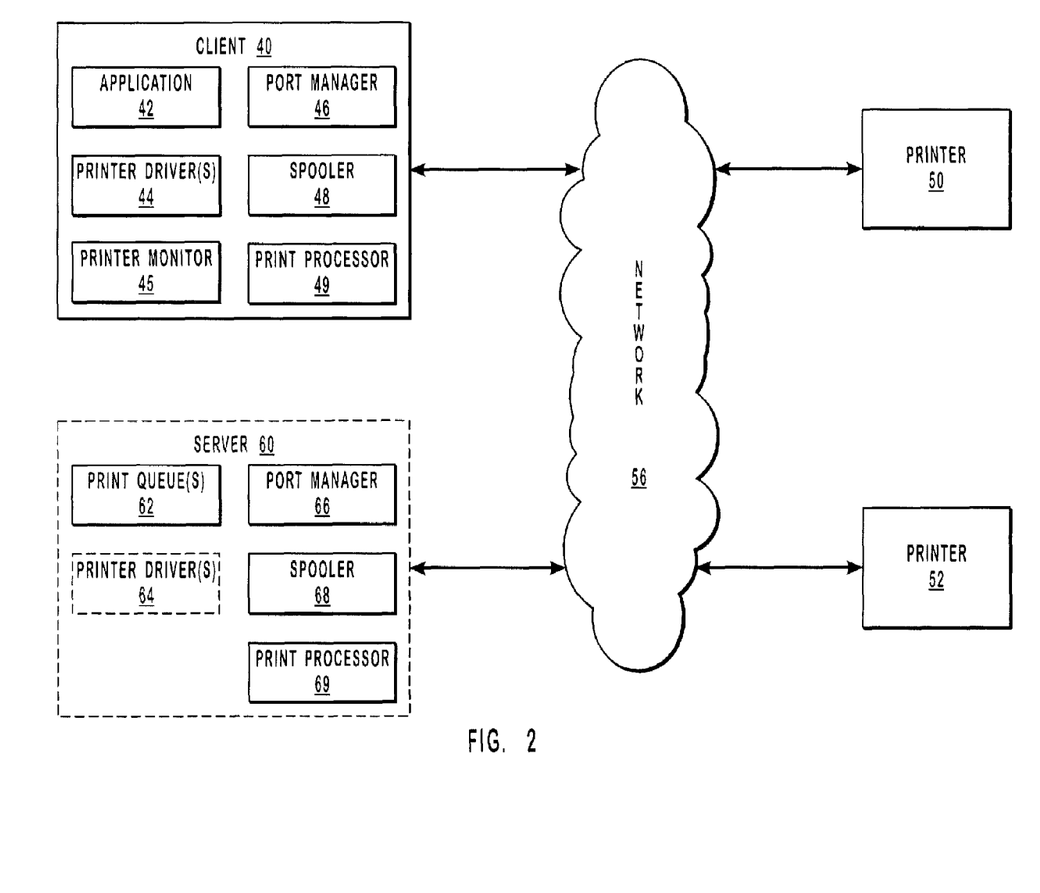
FIG. 2 illustrates a representative printing system configuration.

While those skilled in the art will appreciate that embodiments of the present invention may be practiced in a variety of different environments with many types of computer system configurations, FIG. 2 represents a representative networked system configuration that may be used in association with the present invention. While FIG. 2 illustrates an embodiment that includes a client, two printers, and optionally a print server connected to a network, alternative embodiments include more than one client, more than two printers, no server, and/or more than one server connected to a network. Other embodiments include printing environments where one or more computer devices are locally connected to one or more printing devices. Moreover, embodiments in accordance with the present invention also include wireless networked environments, or where the network is a wide area network, such as the Internet.

The representative system of FIG. 2 includes a computer device, illustrated as client 40, which is connected to a plurality of printing devices (printing devices 50 and 52) across network 56. In FIG. 2, printers 50 and 52 each include printing capabilities. In one embodiment, the capabilities of printer 50 are heterogeneous to the capabilities of printer 52 (e.g., at least one of the capabilities of printer 50 are different from the capabilities of printer 52). In another embodiment, the capabilities of printer 50 are homogeneous to the capabilities of printer 52.

While printers 50 and 52 are connected to network 56, embodiments of the present invention embrace the use of one or more printing devices that are locally connected to a computer device, that are configured in a peer-to-peer printing environment, or that are configured in a wireless network environment. Further, the printing devices may be one or more multi-function printers MFPs, or facsimile devices.

In the illustrated embodiment, client 40 includes a software application 42, one or more print drivers 44, a printer monitor 45, a port manager 46, a spooler 48, and a print processor 49. A printer server 60 is optionally included having, for example, one or more print queues 62, one or more printer drivers 64, a port manager 66, a spooler 68, and a print processor 69.

In accordance with the illustrated embodiment, printer monitor 45 runs as an independent asynchronous process to printer driver 44 and print processor 49. And, prior to the selection of a printer driver, or upon initiation of a selection of a printer driver, the printer monitor 45 discovers printing devices (printers 50 and 52) and printer drivers that are discoverable from the printing source. If a discovered printing device does not have a printer driver installed on printer server 60, printer monitor 45 locates and installs the corresponding or a compatible printer driver for the printing device to be considered as accessible. Upon discovery of the printing devices, printer monitor 45 then discovers the capabilities and status of the discovered printing devices. After discovery, the information may be preserved.

Printer driver 44 and/or print processor 49 query printer monitor 45 to obtain status and capability information relating to one or more printers (printer 50 and/or printer 52). The information is preserved and selectively used by printer driver and/or print processor 44 to perform a desired process, as will be further discussed below.

In another embodiment, the printing system includes a client computing device, optionally a print server, one or more locally and/or network installed printer drivers, a print processor, a print spooler, and one or more locally, network and/or remotely connected printers, means for initiating a print job(s), a document in a local, network or remote, single or multiple printing environment, and means to discover accessible printing devices and network addresses, means to determine the capabilities and status of the printing devices, means to provide printing switchout and job completion notification, integrated with the front end (i.e., printer driver) and back end (i.e., print processor) of the printing process.

Providing Integrated Printer Monitoring

As provided above, embodiments of the present invention relate to monitoring the despooling of a print job. In particular, the present invention relates to systems and methods for providing an integrated printer capabilities/status monitor having a front end and a back end of the printing process for identifying printers, printing capabilities, and status of printers, and for providing a printing device switchout and job completion notification, such that the capabilities and the printing process may be determined and monitored in a unified manner throughout the processing of the print job.

Figure 3:
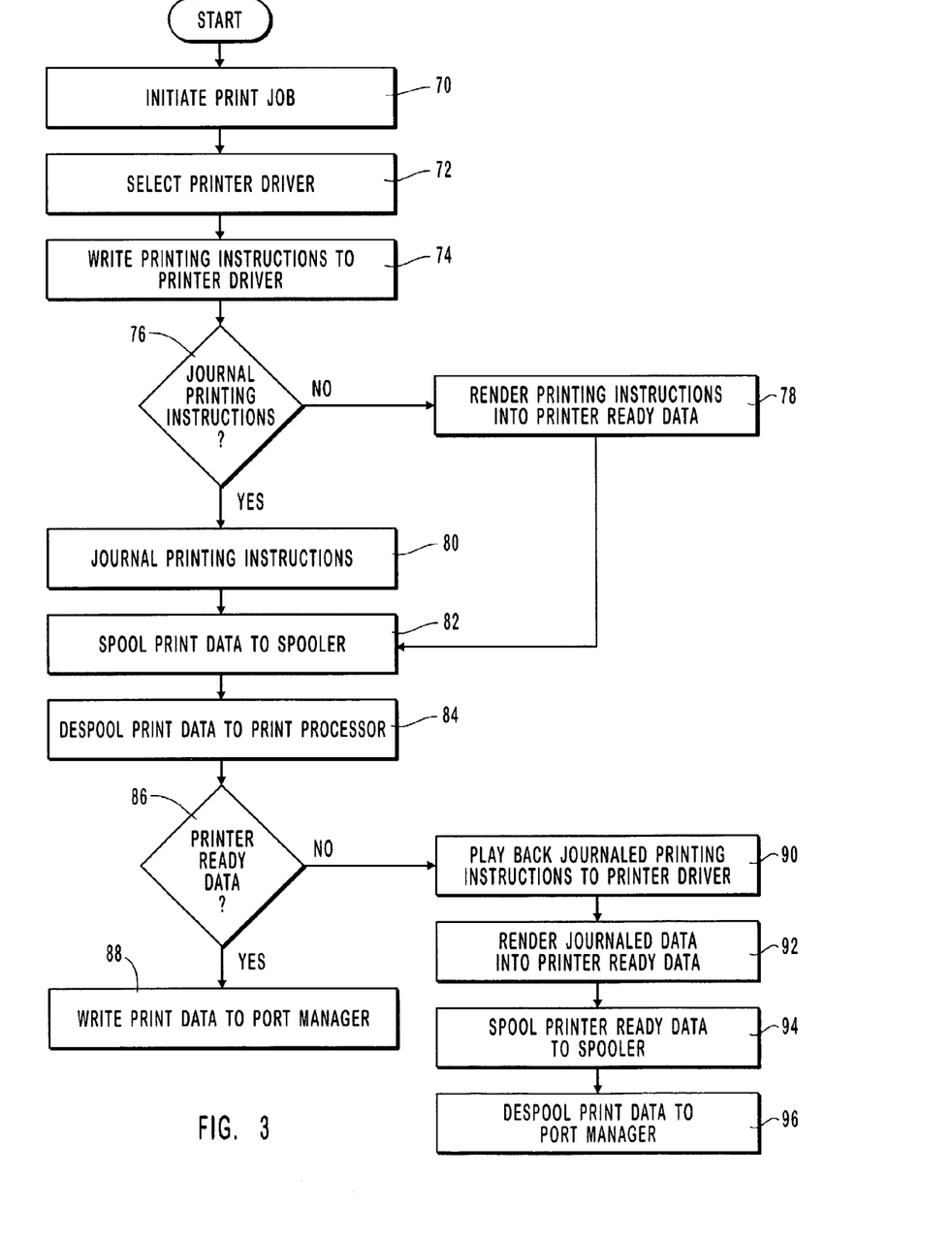
FIG. 3 is a flowchart that provides representative processing from initiating a print job to providing print data to a port manager.

With reference to FIG. 3, representative processing is provided. In FIG. 3, execution begins at step 70, where one or more print jobs are initiated, wherein the print jobs include one or more documents that collectively include one or more copies, and wherein each document includes one or more pages. The print job is initiated from an application, by an automated process, a background process, or a user. Upon initiation of the print job(s), the user selects a command or sequence of commands and/or stimulus to the computing device, that the user intends to despool the print data to one or more printing devices.

Upon initiation, a printer driver is selected at step 72 by a process (e.g., such as through a user selection in a printer menu dialog) and invoked. After invocation, the printing source (e.g., application) writes the printing instructions to the printer driver at step 74. A determination is then made at decision block 76 as to whether or not to journal printing instructions. If it is determined at decision block 76 to journal printing instruction, execution proceeds to step 80 to journal printing instructions. Execution then proceeds to step 82. Alternatively, if it is determined at decision block 76 to not journal the printing instructions, execution proceeds to step 78, where the printing instructions are rendered into printer ready data. Execution then proceeds to step 82.

Accordingly, the printer driver either journals the printing instructions (e.g. EMF) or renders the printing instructions into the printer ready data (i.e., Raster or PDL). At step 82, the printer driver spools the print data to the Spooler. At step 84, the Spooler immediately or on a delayed basis despools the print data to the print processor associated with the printer driver. At decision block 86 a determination is made as to whether or not the data is printer ready. If the data is printer ready data, the print processor writes the print data directly to the port manager of the printing device at step 88. Alternatively, if the print data is journaled data, the print processor plays back the journaled printing instructions back to the printer driver at step 90. At step 92, the printer driver renders the journaled data into printer ready data and at step 94 spools the printer ready data to the spooler. At step 96, the spooler immediately or on a delayed basis despools the print data directly to the port manager of the printing device, as in Windows 98/Me. (As noted previously, embodiments of the present invention embrace other modes for despooling journaled print data.)

Figure 4:
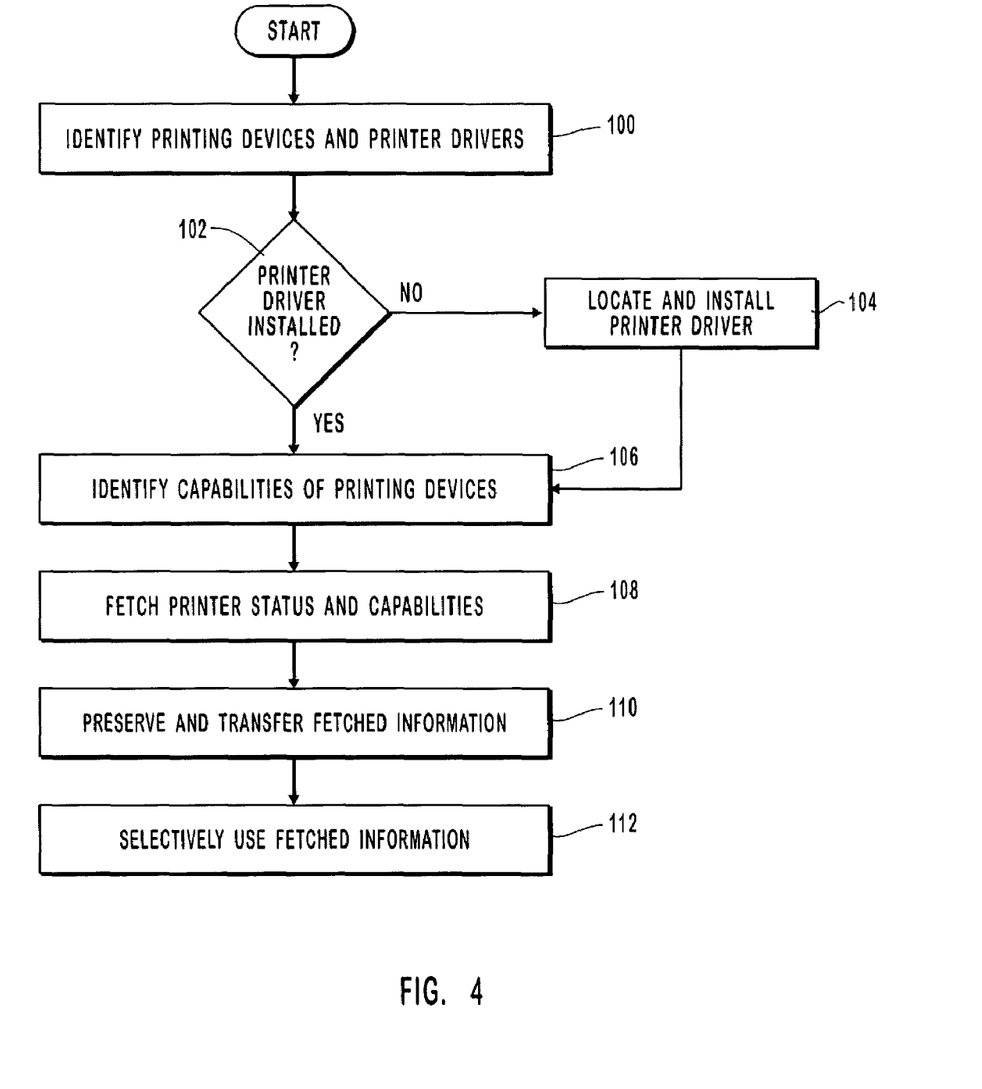
FIG. 4 is a flowchart that provides representative processing for selectively identifying, obtaining and using information.

With reference now to FIG. 4, representative processing is provided for selectively identifying, obtaining and using information in accordance with embodiments of the present invention. In FIG. 4, a printer monitor is running as an independent asynchronous process to the printer driver and print processor. Execution begins at step 100, where prior to the selection of the printer driver, or upon initiation of a selection of a printer driver, the printer monitor identifies/discovers printing devices and printer drivers that are discoverable from the printing source. By way of example, the devices may are discovered by printers and printer drivers installed locally on the printing source, printers and printer drivers installed remotely on a printer server, printers identified in a local domain name service, printers identified in a remote domain name service, self identifying printing devices, a local area network broadcast, a wide area network search, a directory service, etc.

A determination is made at decision block 102 as to whether or not a desired printer driver is installed at a printing device. Thus, if a discovered printing device does not have a printer driver installed locally or remotely on a printer server, at step 104 the printer monitor locates and installs the corresponding or compatible printer driver for the printing device to be considered as accessible. By way of example, the printer driver may be obtained from external media (e.g., CD, Floppy, etc.), a website, a server computing device, or from another location or device.

In one embodiment, a client includes one or locally installed printers, a local DNS server, and one or more network-installed printers that interface with a printer monitor. A server includes a remote DNS server that also interfaces with the printer monitor. A system, such as a network system that includes a LAN broadcast, WAN searches, and self-identifying devices also interfaces with the printer monitor.

With reference back to FIG. 4, the printer monitor discovers the capabilities and status of the discovered printing devices at step 106. By way of example, the discovery may be obtained from SNMP/MIB, IPP, an embedded web server, a model name, a printer database, bi-directional communication, or the like. The capabilities discovered may include, for example, printer identification (e.g., printer model, network address (e.g., IP address), network print queue, etc.), locality (e.g., location, name, owner, commentary, etc.), language interpreters (e.g., raster, PDL (e.g., PCL, PDF, Postscript), etc.), sheet assembly (e.g., reverse order, duplex, booklet, N-Up, etc.), collation (e.g., copy collation, face up printing, etc.), storage capabilities (e.g., RAM, Hard Drive, etc.), and the like. After identification/discovery of the capabilities and status, information relating to the capabilities and status may be stored in memory, disk, registry, database, or other storage means.

In one embodiment that includes a client-server relationship, the client includes a bi-directional query between a printer monitor and local port managers. A query (e.g., SNMP, IPP, etc.) occurs between the printer monitor and another device across a communication connection (e.g., network connection).

At step 108, a printer driver and/or a print processor query the printer monitor to obtain/fetch information relating to the status and capabilities of a printer or printers. In one embodiment, the printer status and capabilities of the current selected printer are fetched from the monitor. Alternatively, if the selected printer driver is a virtual or cluster driver, the status and capabilities are obtained from multiple printers based on criteria, such as belonging to a cluster group, homogeneity, locality, etc.

At step 110 the obtained/fetched information is preserved and transferred. The information fetched from the printer monitor may be stored and transferred by a variety of means. For example, such means includes in-memory storage (transfer by inter-process communication), on-disk storage (transfer by file I/O), registry or database (transfer by access query), shared memory (transferred by common bus or virtual memory mapping), or the like.

At step 112, the printer driver selectively uses the information on status and/or capabilities from the printer monitor to perform a process relating to printer status, printer capabilities, status switchout/filtering, capabilities switchout/filtering, provide job notification status, etc.

Examples of processes relating to printer status include displaying the currently selected printer status (normal print), displaying the status of a group of printers in a printer cluster (cluster print), displaying the status of a logical group of printers (virtual driver), etc.

Examples of processed relating to printer capabilities include displaying the currently selected printer capabilities (normal print), display the capabilities of a group of printers in a printer cluster (cluster print), display the capabilities of a logical group of printers (virtual driver), etc.

Examples of processes relating to status switchout/filtering include automatically, or by user prompt, switching to displaying another printer meeting a status criteria (e.g., ready to print)(normal print), filtering out printers from a group of printers not meeting a status criteria (cluster print), filtering out printers from a logical group of printers not meeting a status criteria (virtual driver), etc.

Examples of processes relating to capabilities switchout/filtering include automatically, or by user prompt, switching to display another printer meeting a capabilities criteria (e.g., duplex) (normal print), filtering out printers from a group of printers not meeting a capabilities criteria (cluster print), filtering out printers from a logical group of printers not meeting a capabilities criteria (virtual driver), etc.

Examples of processes relating to providing job notification status include reporting the status of a print job as it progresses by polling, or report the status of a print job as it progresses by trapping, etc.

One such embodiment includes a printer monitor, wherein queries occur between the printer monitor and a printer driver and/or a print processor. The printer monitor interfaces between the printer driver and the print processor. The printer driver provides print data to a spooler, which in turn provides print data to the print processor. This is an example of a printer status/capabilities inquiry—synchronous In another embodiment, a printer monitor interfaces with a disk, which in turn interfaces with a printer driver and a print processor. The printer driver provides print data to a spooler, which provides print data to the print processor. This is an example of a printer status/capabilities inquiry—asynchronous—disk.

In another embodiment, a printer monitor interfaces with a registry, which in turn interfaces with a printer driver and a print processor. The printer driver provides print data to a spooler, which provides print data to the print processor. This is an example of a printer status/capabilities inquiry—asynchronous—registry.

In another embodiment, a printer monitor interfaces with RAM, which in turn interfaces with a printer driver and a print processor. The printer driver provides print data to a spooler, which provides print data to the print processor. This is an example of a printer status/capabilities inquiry—asynchronous—shared memory.

In another embodiment, a virtual printer driver receives printer status/capabilities information and printing instructions. The virtual printer driver provides printing instructions to one or more printer drivers, which provide print data to a spooler. This is an example of a printer switchout by a printer driver.

In another embodiment, a spooler provides raw (e.g., PDL, raster, etc.) data to a print processor, which also receives printer status/capabilities information. The print processor provides raw (e.g., PDL, raster, etc.) data to one or more port managers. This is an example of a printer switchout by print processor—rendered data.

In another embodiment, a spooler provides journaled (e.g., EMF) data to a print processor, which also receives printer status/capabilities information. The print processor provides journaled (e.g., EMF) data to one or more printer drivers. This is an example of a printer switchout by print processor—journaled data.

At least some embodiments of the present invention are not limited to communicating only with the print driver and print processor, but may include any other component(s) in the print subsystem, such as a spooler, port monitor, etc.

Thus, as discussed herein, the embodiments of the present invention embrace monitoring the despooling of a print job. In particular, the present invention relates to systems and methods for providing an integrated printer capabilities/status monitor having a front end and a back end of the printing process for identifying printers, printing capabilities, and status of printers, and for providing a printing device switchout and job completion notification, such that the capabilities and the printing process may be determined and monitored in a unified manner throughout the processing of the print job. Further at least some of the embodiments of the present invention monitor the despooling of a print job, monitor the progress of the print job on the printing device, monitor/notify completion of or error of the print job, discover the capabilities of the printing device, switch/use printing device based on capabilities, switch/use printing device based on status, recover the print job from a failed printing device, are integrated with front end (e.g., printer driver) and back end (e.g., print processor), and/or discover alternate printing devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a printing system that includes a computer device, a method for providing integrated printer monitoring, the method comprising the steps for:
   providing an independent asynchronous printer monitor monitoring a printing device prior to selection and initiation of a printer driver and operating independently of an application program and the printer driver;
   initiating a print job;
   identifying one or more printing devices;
   when one or more of the identified printing devices does not have any printer driver installed on the computer device, locating and installing a compatible printer driver before printing instructions are sent by an application initiating the print job and automatically and simultaneously with the initiating the print job;
   monitoring a despooling of the print job;
   monitoring a progress of the print job on the one or more printing devices; and
   monitoring completion of the print job.

2. A method as recited in claim 1, further comprising recovering the print job from a failed printing device.

3. A method as recited in claim 1, wherein the step for monitoring completion of the print job includes at least one of the steps for:
   (i) providing a notification of completion of the print job; and
   (ii) providing a notification of an error in the print job.

4. A method as recited in claim 1, further comprising identifying an alternate printing device for use in processing the print job.

5. A method as recited in claim 1, wherein the step for identifying one or more printing devices comprises at least one of the steps for:
   (i) identifying that the one or more printing devices are connected locally with respect to a printing source;
   (ii) identifying that the one or more printing devices are connected remotely to a printer server;
   (iii) identifying that the one or more printing devices are connected peer-peer over a network;
   (iv) identifying that the one or more printing devices are in a local domain name service;
   (v) identifying that the one or more printing devices are in a remote domain name service;
   (vi) using the one or more printing devices to self-identify;
   (vii) using a local area network broadcast to identify the one or more printing devices;
   (viii) using a wide area network search to identify the one or more printing devices; and
   (ix) using a directory service to identify the one or more printing devices.

6. A method as recited in claim 1, wherein the step for and identifying one or more printer drivers for use in processing the print job comprises at least one of the steps for:
   (i) identifying that the one or more printer drivers are locally installed on a printing source;
   (ii) identifying that the one or more printer drivers are remotely installed on a printer server;
   (iii) identifying that the one or more printing devices are connected peer-peer over a network;
   (iv) identifying that the one or more printer drivers are in a local domain name service;
   (v) identifying that the one or more printer drivers are in a remote domain name service;
   (vi) using a local area network broadcast to identify the one or more printer drivers;
   (vii) using a wide area network search to identify the one or more printer drivers; and
   (viii) using a directory service to identify the one or more printing devices.

7. A method as recited in claim 1, further comprising identifying one or more capabilities of the one or more printing devices for use in processing the print job, wherein the identifying one or more capabilities comprises at least one of the steps for:
   (i) using SNMP/MIB to identify the one or more capabilities;
   (ii) using IPP to identify the one or more capabilities;
   (iii) using an embedded web server to identify the one or more capabilities;
   (iv) using a model name to identify the one or more capabilities;
   (v) using a printer database to identify the one or more capabilities;
   (vi) using bi-directional communication to identify the one or more capabilities;
   (vii) using bmLinks to identify the one or more capabilities;
   (viii) using SLP to identify the one or more capabilities; and
   (ix) using an installed printer configuration information.

8. A method as recited in claim 7, wherein the one or more capabilities identified relate to at least one of:
   (i) printer identification;
   (ii) locality;
   (iii) a language interpreter;
   (iv) sheet assembly;
   (v) collation;
   (vi) a storage capability;
   (vii) a rendering capability; and
   (viii) a finishing capability.

9. A method as recited in claim 7, wherein the step for identifying one or more capabilities of the one or more printing devices for use in processing the print job includes a step for obtaining information for selective use, wherein the information relates to at least one of:
   (i) a status of the one or more printing devices; and
   (ii) a performance capability of the one or more printing devices.

10. A method as recited in claim 9, wherein the information obtained for selective use is utilized to perform at least one of the steps for:
    (i) displaying a status of a selected printer;
    (ii) displaying a status of a group of printers in a printer cluster;
    (iii) displaying a status of a logical group of printers;
    (iv) displaying a capability of a selected printer;
    (v) displaying one or more capabilities of a group of printers in a printer cluster;
    (vi) displaying one or more capabilities of a logical group of printers;

(vii) switching use to a subsequent printer to meet a desired status;
(viii) filtering out one or more printers for use, wherein the filtered-out printers do not meet a desired status;
(ix) switching use to a subsequent printer to meet one or more desired capabilities;
(x) filtering out one or more printers for use, wherein the filtered-out printers do not meet one or more desired capabilities;
(xi) using a polling process to report a status of the print job as the print job progresses through processing;
(xii) using a trapping process to report a status of the print job as the print job progresses through processing;
(xiii) recovering a failed print job; and
(xiv) obtaining a job completion notification.

11. An integrated printer monitoring system comprising:
a front end;
a back end;
a printer monitor monitoring a printing device prior to selection and initiation of a printer driver and operating independently of an application program and the printer driver integrated with the front end and the back end, wherein the printer monitor is configured to run as an independent asynchronous process to the front end and the back end, and wherein the printer monitor is configured to locate and install a printer driver for the printing device, when the integrated printer monitoring system does not have any printer driver installed, upon initiation of a print job and before printing instructions are sent by an application initiating the print job and automatically and simultaneously with the initiating the print job.

12. An integrated printer monitoring system as recited in claim 11, wherein the printer monitor is further configured to discover an alternate printing device.

13. An integrated printer monitoring system as recited in claim 11, wherein the back end is a print processor.

14. An integrated printer monitoring system as recited in claim 13, wherein the front end is a printer driver.

15. An integrated printer monitoring system as recited in claim 14, wherein the printer monitor is further configured to recover a print job from a failed printing device.

16. A computer program product for implementing within a computer system a method for providing integrated printer monitoring, the computer program product comprising:
a computer readable medium for providing computer program code means utilized to implement the method, wherein the computer program code means is comprised of executable code for implementing the steps for:
providing an independent asynchronous printer monitor monitoring a printing device prior to selection and initiation of a printer driver and operating independently of an application program and the printer driver;
initiating a print job;
identifying one or more printing devices;
when one or more of the identified printing devices does not have any printer driver installed on the computer system, locating and installing a compatible printer driver before printing instructions are sent by an application initiating the print job and automatically and simultaneously with the initiating the print job;
monitoring a despooling of the print job;
monitoring a progress of the print job on the one or more printing devices; and
monitoring completion of the print job.

17. A computer program product as recited in claim 16, wherein the computer program code means is further comprised of executable code for recovering the print job from a failed printing device.

18. A computer program product as recited in claim 17, wherein the step for monitoring completion of the print job includes at least one of the steps for:
(i) providing a notification of completion of the print job; and
(ii) providing a notification of an error in the print job.

19. A computer program product as recited in claim 16, further comprising executable code for identifying one or more capabilities of the one or more printing devices for use in processing the print job, wherein the identifying one or more capabilities comprises at least one of the steps for:
(i) using SNMP/MIB to identify the one or more capabilities;
(ii) using IPP to identify the one or more capabilities;
(iii) using an embedded web server to identify the one or more capabilities;
(iv) using a model name to identify the one or more capabilities;
(v) using a printer database to identify the one or more capabilities;
(vi) using bi-directional communication to identify the one or more capabilities;
(vii) using bmLinks to identify the one or more capabilities;
(viii) using SLP to identify the one or more capabilities; and
(ix) using an installed printer configuration information.

20. A computer program product as recited in claim 19, wherein the step for identifying one or more capabilities of the one or more printing devices for use in processing the print job includes a step for obtaining information for use in performing at least one of the steps for:
(i) displaying a status of a selected printer;
(ii) displaying a status of a group of printers in a printer cluster;
(iii) displaying a status of a logical group of printers;
(iv) displaying a capability of a selected printer;
(v) displaying one or more capabilities of a group of printers in a printer cluster;
(vi) displaying one or more capabilities of a logical group of printers;
(vii) switching use to a subsequent printer to meet a desired status;
(viii) filtering out one or more printers for use, wherein the filtered-out printers do not meet a desired status;
(ix) switching use to a subsequent printer to meet one or more desired capabilities;
(x) filtering out one or more printers for use, wherein the filtered-out printers do not meet one or more desired capabilities; and
(xi) using a polling process to report a status of the print job as the print job progresses through processing; and
(xii) using a trapping process to report a status of the print job as the print job progresses through processing;
(xiii) recovering a failed print job; and
(xiv) obtaining a job completion notification.

* * * * *